United States Patent
Hsu

(10) Patent No.: US 7,991,045 B2
(45) Date of Patent: Aug. 2, 2011

(54) DEVICE AND METHOD FOR TESTING SIGNAL-RECEIVING SENSITIVITY OF AN ELECTRONIC SUBASSEMBLY

(75) Inventor: Shou-Kuo Hsu, Tu-Cheng (TW)

(73) Assignee: Hon Hai Precision Industry Co., Ltd., Tu-Cheng, New Taipei (TW)

(*) Notice: Subject to any disclaimer, the term of this patent is extended or adjusted under 35 U.S.C. 154(b) by 1465 days.

(21) Appl. No.: 11/308,933

(22) Filed: May 29, 2006

(65) Prior Publication Data

US 2006/0291547 A1 Dec. 28, 2006

(30) Foreign Application Priority Data

Jun. 10, 2005 (CN) .......................... 2005 1 0035299
Jul. 18, 2005 (CN) .......................... 2005 1 0036094
Sep. 28, 2005 (CN) .......................... 2005 1 0100037

(51) Int. Cl.
*H04B 3/46* (2006.01)
*G01R 31/08* (2006.01)
*G10L 19/00* (2006.01)

(52) U.S. Cl. .................. 375/226; 370/229; 704/216

(58) Field of Classification Search .................. 375/226; 370/229

See application file for complete search history.

(56) References Cited

U.S. PATENT DOCUMENTS

| | | | | |
|---|---|---|---|---|
| 6,157,606 A | * | 12/2000 | Inazawa et al. | 369/116 |
| 6,259,666 B1 | * | 7/2001 | Kobayashi et al. | 369/59.11 |
| 6,754,158 B1 | * | 6/2004 | Kobayashi et al. | 369/59.11 |
| 2003/0093267 A1 | * | 5/2003 | Leichtling et al. | 704/215 |
| 2004/0044488 A1 | * | 3/2004 | Hanai et al. | 702/77 |
| 2005/0007952 A1 | * | 1/2005 | Scott | 370/229 |

* cited by examiner

*Primary Examiner* — Shuwang Liu
*Assistant Examiner* — Sarah Hassan
(74) *Attorney, Agent, or Firm* — Wei Te Chung

(57) ABSTRACT

A device and a method for testing signal-receiving sensitivity of an electronic subassembly are provided. The device includes a control board and a computer. The control board is connected to the electronic subassembly. The computer is connected to the control board and also connected to the electronic subassembly. Wherein signals sent by the computer are compared with signals received by the computer for adjusting predetermined parameters associated with the signal-receiving sensitivity.

5 Claims, 3 Drawing Sheets

DEVICE AND METHOD FOR TESTING SIGNAL-RECEIVING SENSITIVITY OF AN ELECTRONIC SUBASSEMBLY

FIELD OF THE INVENTION

The present invention relates to a device and a method for testing signal-receiving sensitivity, and particularly to a device and a method for testing signal-receiving sensitivity of an electronic subassembly.

DESCRIPTION OF RELATED ART

Peripheral Component Interconnect (PCI) is a parallel bus architecture developed in 1992 which has become the predominant local bus for personal computers and similar platforms. The implementation of this technology has come close to its practical limits of performance. A new architecture utilizing point-to-point transmission, having high-speed serial lanes at 2.5 Gbit/second or higher to transmit signals, and which is scalable for future improvements, is known as PCI Express.

Accordingly an add-on cards as an electronic subassembly adopting a PCI Express standard is generated and brought to the market. Thus, it is necessary to test the performance of transmitting and receiving the signals of the add-on card. Conventionally a method for testing physical PCI Express link paths on a motherboard using PCI Express devices provides a test card connected to a predetermined input/output port on the motherboard, wherein the test card has a PCI Express test device. A test pattern is transmitted from the test card to the PCI Express device. The test card receives a test result pattern from the PCI Express device through the physical link for testing thereof. The test result pattern is examined to determine defects of the physical link on the motherboard.

Current PCI Express standard provides parameters of signal-receiving sensitivity of the add-on card, such as a maximum jitter level, a minimum output voltage level with a de-emphasis level set, a minimum output voltage level without a de-emphasis level set, and a maximum de-emphasis. If such parameters can be tested, the signal-receiving sensitivity is acquired, and the transmitting and receiving characteristic of the add-on card is more clearly defined.

What is needed, therefore, is a device and a method for testing signal-receiving sensitivity of the add-on card.

SUMMARY OF THE INVENTION

A device and a method for testing signal-receiving sensitivity of an electronic subassembly is provided. In a preferred embodiment, the device includes: a control board connected to the electronic subassembly; and a computer connected to the control board and also connected to the electronic subassembly, wherein signals sent by the computer are compared with signals received by the computer for adjusting predetermined parameters associated with the signal-receiving sensitivity. It is of advantage that the user can acquire the signal-receiving sensitivity and clearly define the transmitting and receiving characteristic of the electronic subassembly.

Other advantages and novel features will become more apparent from the following detailed description when taken in conjunction with the accompanying drawings, in which:

DETAILED DESCRIPTION OF THE INVENTION

Figure 1:
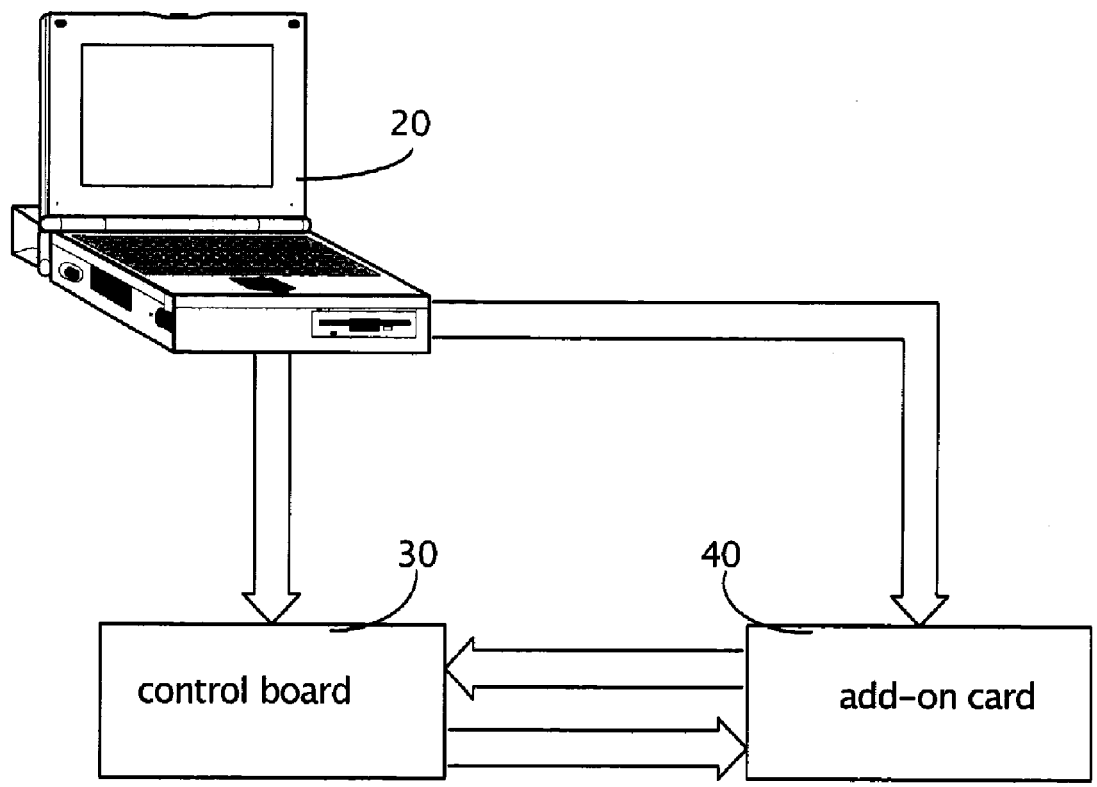
FIG. 1 is a schematic diagram of a device for testing signal-receiving sensitivity of an add-on card, in accordance with a preferred embodiment of the present invention.

FIG. 1 shows a device for testing signal-receiving sensitivity of an electronic subassembly like an add-on card, in accordance with a preferred embodiment of the present invention. The device includes a computer 20, a control board 30, and an add-on card 40. The computer 20 is used to control and adjust parameters of a test. The add-on card 40 adopting a PCI Express standard includes an input/output interface and a PCI Express interconnecting interface (not shown). The control board 30 is connected to the PCI Express interconnecting interface of the add-on card 40. The computer 20 has input/output interfaces connected to the control board 30 and also connected to the input/output interface of the add-on card 40.

Figure 2:
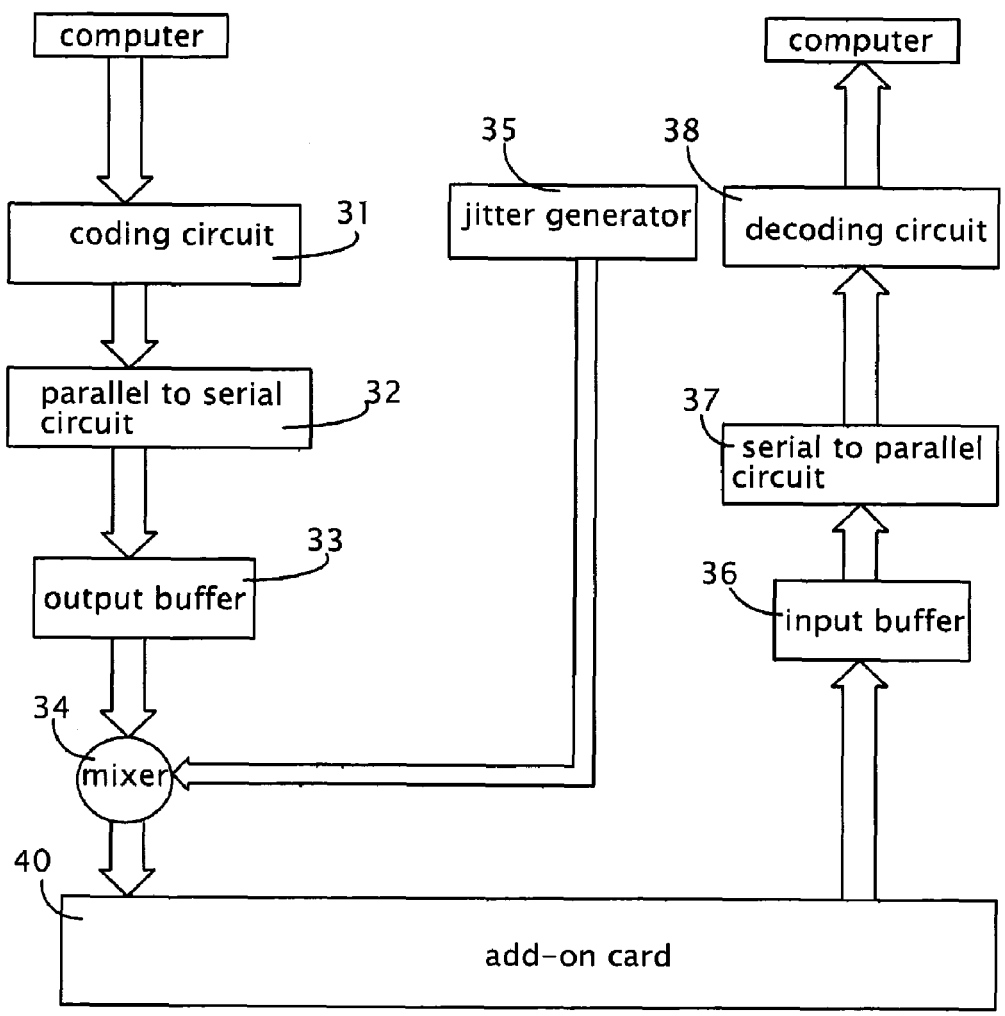
FIG. 2 is a circuit diagram of a control board of FIG. 1.

FIG. 2 is a circuit diagram of a control board of FIG. 1. The control board 30 includes a coding circuit 31, a parallel-to-serial circuit 32, an output buffer 33, a mixer 34, a jitter generator 35, an input buffer 36, a serial-to-parallel circuit 37, and a decoding circuit 38. The computer 20 sends out random signals including data signals and control signals to the coding circuit 31. The coding circuit 31 converts the random signals to parallel signals matching the PCI Express interconnecting interface. The parallel-to-serial circuit 32 is connected to the coding circuit 31 for converting parallel signals to serial signals. The serial signals can be transmitted at a higher speed. The output buffer 33 is connected to the parallel-to-serial circuit 32 for converting the serial signals to high-speed simulating signals. The high-speed simulating signals can be transmitted without distortion. The output buffer 33 includes registers (not shown) for adjusting parameters such as a jitter level, an output voltage, and a de-emphasis level associated with the signal-receiving sensitivity by making adjustments to settings via substrate software of the computer 20, e.g., a basic input/output system. The mixer 34 is connected between the output buffer 33 and the add-on card 40 for mixing the high-speed simulating signals and a jitter level and then generating analog signals to the add-on card 40. The jitter generator 35 is connected to the mixer 34 for generating the jitter level.

The add-on card 40 is set in a loopback state via substrate software of the computer 20. Once the add-on card 40 receives the analog signals from the mixer 34, the add-on card 40 immediately sends out high-speed analog signals. The input buffer 36 is connected to the add-on card 40 for converting the high-speed analog signals to serial signals. The serial-to-parallel circuit 37 converts the serial signals output from the input buffer 36 to parallel signals. The decoding circuit 38 converts the parallel signals output from the serial-to-parallel circuit 38 to digital signals and then the digital signals are input to the computer 20.

Figure 3:
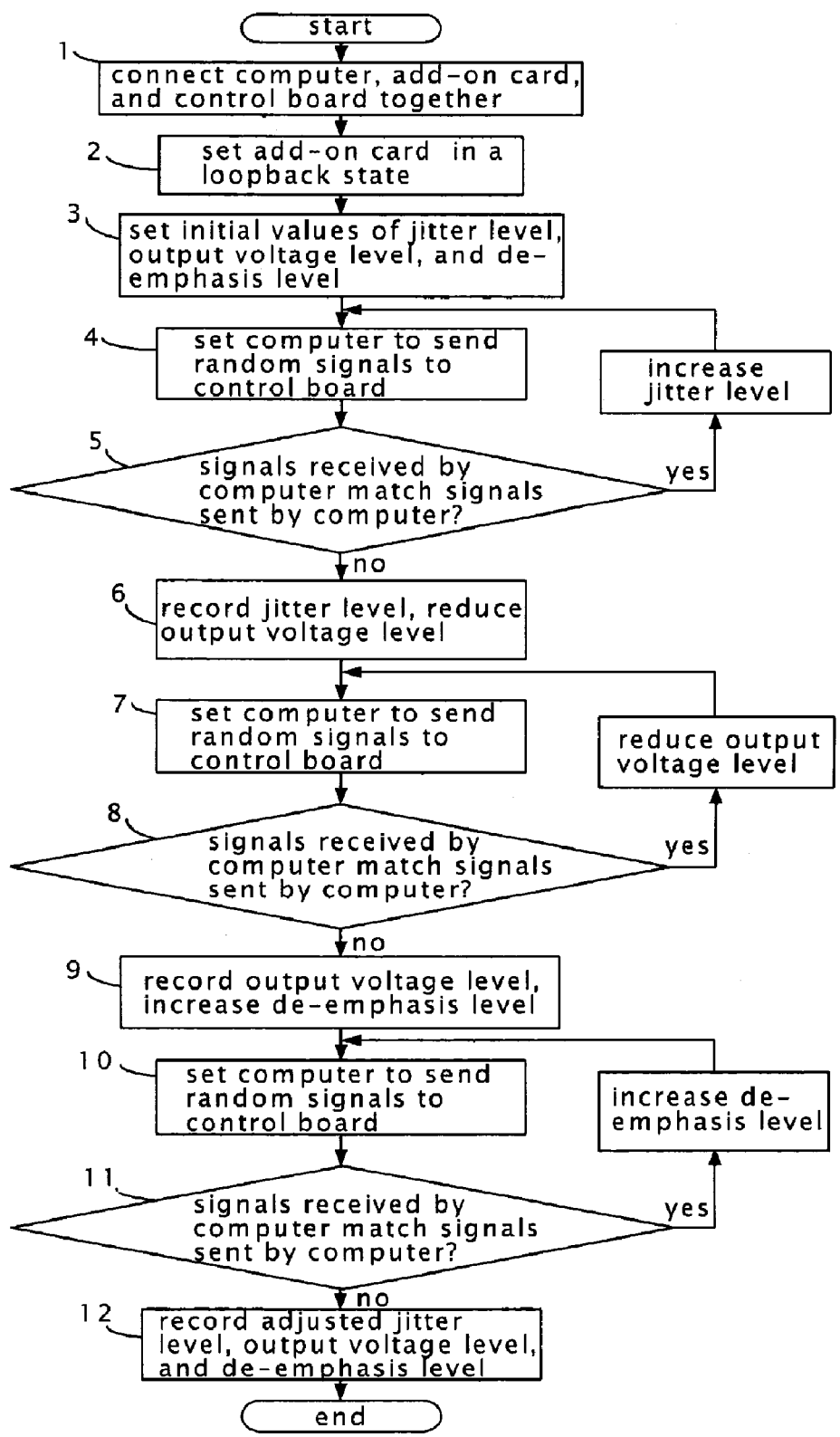
FIG. 3 is a flow chart of a method for testing signal-receiving sensitivity of an add-on card, in accordance with a preferred embodiment of the present invention.

Referring to FIG. 3, a method for testing signal-receiving sensitivity of an add-on card, in accordance with a preferred embodiment of the present invention includes the following steps.

Step 1: powering up the computer 20 after components of the device for testing signal-receiving sensitivity of the add-on card are connected;

Step 2: setting the add-on card 40 in the loopback state via substrate software of the computer 20;

Step 3: setting initial values of a jitter level, an output voltage level, and a de-emphasis level via substrate software of the computer, e.g., respectively 0, 1200 mv, and 0;

Step 4: setting the computer 20 to send random signals to the control board 30, the control board 30 transmitting the signals to the add-on card 40, the add-on card 40 returning the signals to the control board 30, and the control board 30 transmitting the signals to the computer 20;

Step 5: the computer 20 comparing the received signals with the sent signals, if the received signals match the sent signals, increasing the jitter level, and returning to step 4; and if the received signals do not match the sent signals, going to step 6;

Step 6: recording the jitter level, and reducing the output voltage level;

Step 7: setting the computer 20 to send random signals to the control board 30;

Step 8: the computer 20 comparing the received signals with the sent signals, if the received signals match the sent signals, reducing the output voltage level, and returning to step 7; and if the received signals do not match the sent signals, going to step 9;

Step 9: recording the output voltage level, and increasing the de-emphasis level;

Step 10: setting the computer 20 to send random signals to the control board 30;

Step 11: the computer 20 comparing the received signals with the sent signals, if the received signals match the sent signals, increasing the de-emphasis level, and returning to step 10; and if the received signals do not match the sent signals, going to step 12;

Step 12: recording a maximum jitter level, a minimum output voltage level without a de-emphasis level set, and a maximum de-emphasis level as adjusted in the foregoing steps.

The minimum output voltage level with a de-emphasis level set is found using the following formula that uses a relationship between the minimum output voltage level without a de-emphasis level set and the maximum de-emphasis level:

$$V1=V2*10^{0.05T}$$

V1 is the minimum output voltage level with a de-emphasis level set, and V2 is the minimum output voltage level without a de-emphasis level set, and T is the maximum de-emphasis level. T and V2 are found in the foregoing test method and applied to the above formula, thus the parameters of signal-receiving sensitivity of the add-on card are acquired.

The foregoing test method firstly adjusts the jitter level, secondly adjusts the output voltage level, and finally adjusts the de-emphasis level. The adjusting order of these parameters is not limited and can be changed, e.g. adjusting the output voltage level at first, adjusting the jitter level secondly, and finally adjusting the de-emphasis level.

The device and the method can also be used for testing signal-receiving sensitivity of another electronic subassembly, e.g. an motherboard, which may adopt a PCI Express standard, a Serial Advanced Technology Attachment (SATA) standard or a Serial Attached Small Computer System Interface (SAS) standard.

It is believed that the present invention and its advantages will be understood from the foregoing description, and it will be apparent that various changes may be made thereto without departing from the spirit and scope of the invention or sacrificing all of its material advantages, the examples hereinbefore described merely being preferred or exemplary embodiments of the invention.

What is claimed is:

1. A device for testing signal-receiving sensitivity of an electronic subassembly, the device comprising:

a control board connected to the electronic subassembly; and a computer connected to the control board and also connected to the electronic subassembly, wherein signals sent by the computer are compared with signals received by the computer for adjusting predetermined parameters associated with the signal-receiving sensitivity, wherein the control board comprises:

a coding circuit for converting random signals output from the computer to parallel signals;

a parallel-to-serial circuit connected to the coding circuit for converting parallel signals to serial signals;

an output buffer connected to the parallel-to-serial circuit for converting the serial signals to high-speed simulating signals;

a mixer connected between the output buffer and the electronic subassembly for mixing the high-speed simulating signals and a jitter level and then generating analog signals to the electronic subassembly, the electronic subassembly thereby generating high-speed analog signals;

a jitter generator connected to the mixer for generating the jitter level;

an input buffer connected to the electronic subassembly for receiving high-speed analog signals and then outputting serial signals;

a serial-to-parallel circuit for converting the serial signals output from the input buffer to parallel signals; and a decoding circuit for converting the parallel signals output from the serial-to-parallel circuit to digital signals and then the digital signals being input to the computer, wherein the digital signals are compared with the random signals.

2. The device as claimed in claim 1, wherein the output buffer comprises registers for adjusting parameters of a jitter level, an output voltage, and a de-emphasis level associated with the signal-receiving sensitivity by adjusting settings via substrate software of the computer.

3. A method for testing signal-receiving sensitivity of an electronic subassembly, the method comprising the steps of:

providing a control board connected to the electronic subassembly, and a computer connected to the control board and also connected to the electronic subassembly;

setting the electronic subassembly in a loopback state via substrate software of the computer;

setting initial values of a jitter level, an output voltage level, and a de-emphasis level via substrate software of the computer;

setting the computer to send random signals to the control board, the control board transmitting the signals to the electronic subassembly, the electronic subassembly returning the signals to the control board, and the control board transmitting the signals to the computer; and adjusting respectively the jitter level, the output voltage level, and the de-emphasis level, until the signals sent by the computer match the signals received by the computer, to acquire a maximum jitter level, a minimum output voltage level, and a maximum de-emphasis level as the signal-receiving sensitivity of the electronic subassembly, wherein the adjusting step comprises:

adjusting the jitter level to acquire the maximum jitter level;

adjusting the output voltage level to acquire the minimum output voltage level; and adjusting the de-emphasis level to acquire the maximum de-emphasis level; and wherein the step of adjusting the jitter level comprises: if the signals sent by the computer match the signals received by the computer, increasing the jitter level, and setting the computer to send random signals again; and if the signals sent by the computer do not match the signals received by the computer, recording the jitter level as the maximum jitter level, and reducing the output voltage level.

4. The method as claimed in claim 3, wherein the step of adjusting the output voltage level comprises: if the signals sent by the computer match the signals received by the computer, reducing the output voltage level, and setting the computer to send random signals again; and if the signals sent by the computer do not match the signals received by the computer, recording the output voltage level as the minimum output voltage level, and increasing de-emphasis level.

5. A method for testing signal-receiving sensitivity of an electronic subassembly, the method comprising the steps of:
providing a control board connected to the electronic subassembly, and a computer connected to the control board and also connected to the electronic subassembly;
setting the electronic subassembly in a loopback state via substrate software of the computer;
setting initial values of a jitter level, an output voltage level, and a de-emphasis level via substrate software of the computer;
setting the computer to send random signals to the control board, the control board transmitting the signals to the electronic subassembly, the electronic subassembly returning the signals to the control board, and the control board transmitting the signals to the computer; and
adjusting respectively the jitter level, the output voltage level, and the de-emphasis level, until the signals sent by the computer match the signals received by the computer, to acquire a maximum jitter level, a minimum output voltage level, and a maximum de-emphasis level as the signal-receiving sensitivity of the electronic subassembly, wherein the adjusting step comprises:
adjusting the jitter level to acquire the maximum jitter level;
adjusting the output voltage level to acquire the minimum output voltage level; and
adjusting the de-emphasis level to acquire the maximum de-emphasis level; wherein the step of adjusting the de-emphasis level comprises: if the signals sent by the computer match the signals received by the computer, increasing de-emphasis level, and setting the computer to send random signals again; and if the signals sent by the computer do not match the signals received by the computer, recording the de-emphasis level as the maximum de-emphasis level.

* * * * *